US 6,678,409 B1

(12) United States Patent
Wu et al.

(10) Patent No.: US 6,678,409 B1
(45) Date of Patent: Jan. 13, 2004

(54) PARAMETERIZED WORD SEGMENTATION OF UNSEGMENTED TEXT

(75) Inventors: Andi Wu, Bellevue, WA (US); Zixin Jiang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/484,369

(22) Filed: Jan. 14, 2000

(51) Int. Cl.⁷ ............................................... G06K 9/34
(52) U.S. Cl. .................... 382/177; 382/181; 382/229; 704/10
(58) Field of Search .................. 382/159, 173, 382/177, 179, 181, 185, 187, 202, 226, 229, 230, 305, 176; 400/109, 110; 704/1–10, 200, 220

(56) References Cited

U.S. PATENT DOCUMENTS

| | | | |
|---|---|---|---|
| 4,850,026 A | | 7/1989 | Jeng et al. .................. 382/185 |
| 4,887,212 A | * | 12/1989 | Zamora et al. ................. 704/8 |
| 5,029,084 A | * | 7/1991 | Morohasi et al. .............. 704/9 |
| 5,448,474 A | * | 9/1995 | Zamora ......................... 704/9 |
| 5,454,046 A | | 9/1995 | Carman, II .................. 382/187 |
| 5,473,607 A | | 12/1995 | Hausman et al. ........ 370/85.13 |
| 5,651,095 A | * | 7/1997 | Ogden ......................... 704/260 |
| 5,740,549 A | | 4/1998 | Reilly et al. .................. 705/14 |
| 5,787,197 A | | 7/1998 | Beigi et al. .................. 382/187 |
| 5,806,021 A | * | 9/1998 | Chen et al. ...................... 704/9 |
| 5,850,480 A | | 12/1998 | Scanion ........................ 382/187 |
| 5,923,778 A | | 7/1999 | Chen et al. .................. 382/187 |
| 5,933,525 A | | 8/1999 | Makhoul et al. ............ 382/185 |
| 5,940,532 A | | 8/1999 | Tanaka ........................ 382/187 |
| 6,014,615 A | | 1/2000 | Chen ............................. 704/3 |
| 6,035,268 A | * | 3/2000 | Carus et al. ................... 704/9 |
| 6,173,253 B1 | * | 1/2001 | Abe et al. ..................... 704/10 |
| 6,182,029 B1 | * | 1/2001 | Friedman ...................... 704/9 |
| 6,363,342 B2 | * | 3/2002 | Shaw et al. ................ 704/220 |
| 6,374,210 B1 | * | 4/2002 | Chu ............................... 704/9 |

FOREIGN PATENT DOCUMENTS

| | | | |
|---|---|---|---|
| EP | 0 653 736 A1 | 5/1988 | ............ G08B/5/22 |
| EP | 0 650 306 A1 | 10/1994 | ............ H04Q/7/32 |
| WO | WO 95/12955 | 5/1995 | ............ H04Q/7/00 |
| WO | WO 97/17682 | 5/1997 | ............ G08B/5/22 |
| WO | WO 97/35402 | 9/1997 | ............. H04L/9/00 |

OTHER PUBLICATIONS

Lua, et al "An application of information theory in Chinese word segmentation", Computer processing of Chinese & Oriental Languages, pp. 1–9, 1994.*

Palmer, et al "Chinese word segmentation and information retrieval", AAAI Spring Symosium on Cross–Language Text and Speech Retrieval, pp. 1–6, 1997.*

Chen, et al. "Chinese text retrieval without using dictionary", ACM, pp. 42–49, 1997.*

(List continued on next page.)

*Primary Examiner*—Daniel G. Mariam
(74) *Attorney, Agent, or Firm*—Joseph R. Kelly; Westman, Champlin & Kelly, P.A.

(57) ABSTRACT

The present invention segments a non-segmented input text. The input text is received and segmented based on parameter values associated with parameterized word formation rules. In one illustrative embodiment, the input text is processed into a form which includes parameter indications, but which preserves the word-internal structure of the input text. Thus, the parameter values can be changed without entirely re-processing the input text.

18 Claims, 5 Drawing Sheets

OTHER PUBLICATIONS

Chi, et al "Word segmentation and recognition for web document framework", ACM, pp. 458–465, Jan. 1999.*

Ge, et al "Discovering Chinese words from un–segmented text", ACM, pp. 271–272, Jan. 1999.*

Kuo, et al "A new method for the segmentation of mixed handprinted Chinese/English characters", IEEE, pp. 810–813, 1993.*

Packard, Jerome L. (1998) New Approached to Chinese Word Formation: Morphology, Phonology and the Lexicon in Modern and Ancient Chinese. Mouton de Gruyter, New York.

Ren, Xueliang (1981) Word Formation in Chinese. China Press of Social Sciences, Beijing.

Coates–Stephens "The Analysis and Acquisition of Proper Names for the Understanding of Free Text", Computer and the Humanities, vol. 26, 441–456, 1993.

Yhap, et al. "an On–Line Chinese Character Recognition System", IBM J. Res. Develop. vol. 25, No. 3, pp. 187–189, May 1991.

Coates–Stephens "The Analysis and Acquisition of Proper Names for Robust Text Understanding", Dept. of Computer Science, CIty University, London England, Oct. 1992, pp. 1–8, 28–38, 113–133, and 200–206.

Chen et al., "Word Identification for Mandarin Chinese Sentences", Proceedings of the 14th International Conference on Computational Linguistics (Coling '92), pp. 101–107, Nantes, France.

Chang et al., "A Multiple–Corpus Approach to Recognition of Proper Names in Chinese Texts", Computer Processing of Chinese and Oriental Languages, Vo. 8, No. 1, Jun. 1994, pp. 75–85.

Yuan et al., "Splitting–Merging Model for Chinese Word Tokenization and Segmentation", Department of Information Systems & Computer Sciences, National University of Singapore. No date.

Kok–Wee Gan et al., "A Statistically Emergent Approach for Language Processing: Application to Modeling Context Effects in Ambiguous Chinese Word Boundary Perception," Computational Linguistics, vol. 22, No. 4, 1996, pp. 531–551.

Jin Guo, "Critical Tokenization and its Properties," Computational Linguistics, vol. 23, No. 4, 1997, pp. 569–596.

Richard Sproat et al., "A Stochastic Finite–State Word–Segmentation Algorithm for Chinese," Computational Linguistics, vol. 22, No. 3, 1996, pp. 376–404.

Zimin Wu et al., "Chinese Text Segmentation for Text Retrieval: Achievements and Problems," Journal of the American Society for Information Science, vol. 44, No. 9, 1993, pp. 532–542.

* cited by examiner

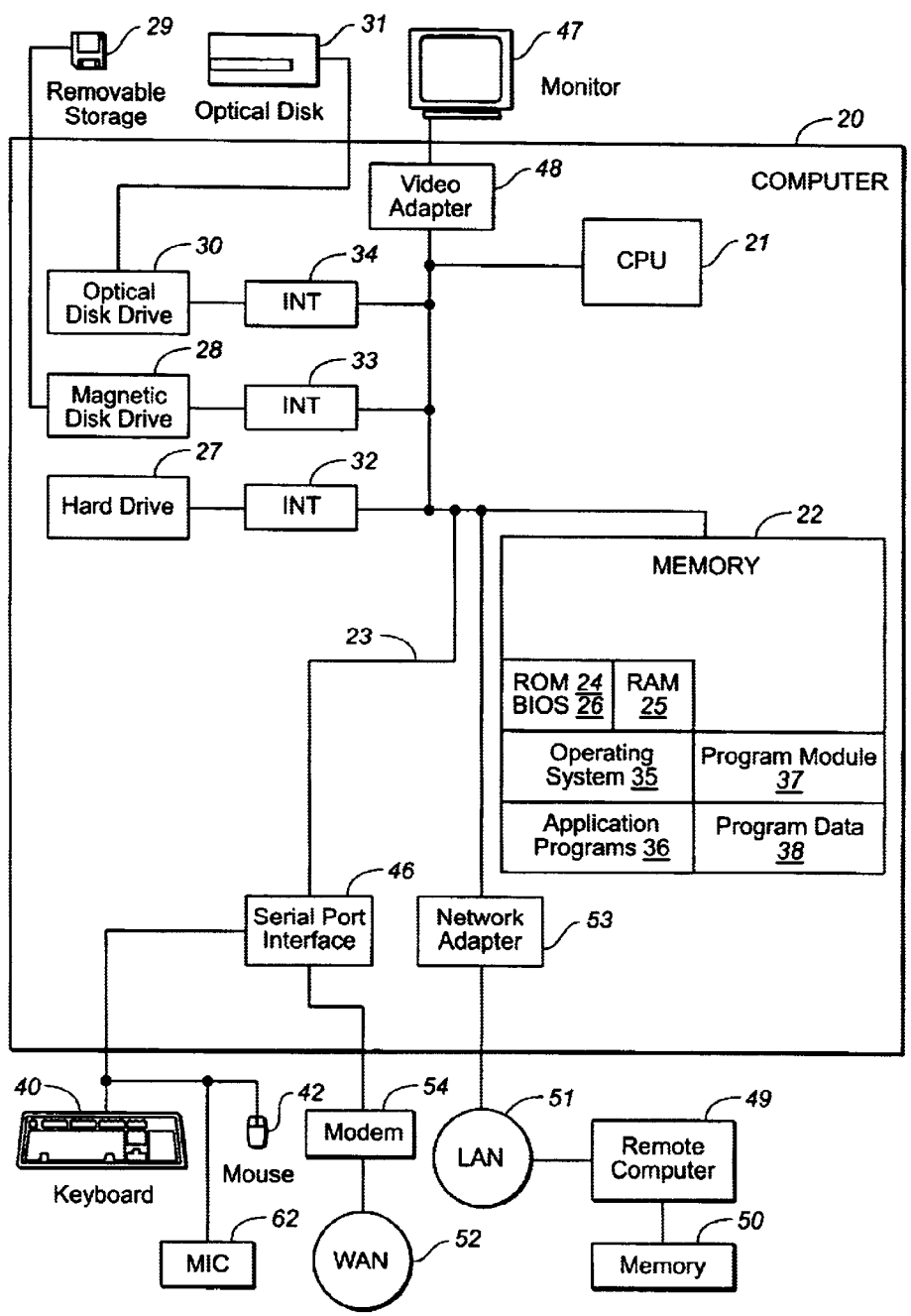
FIG._1

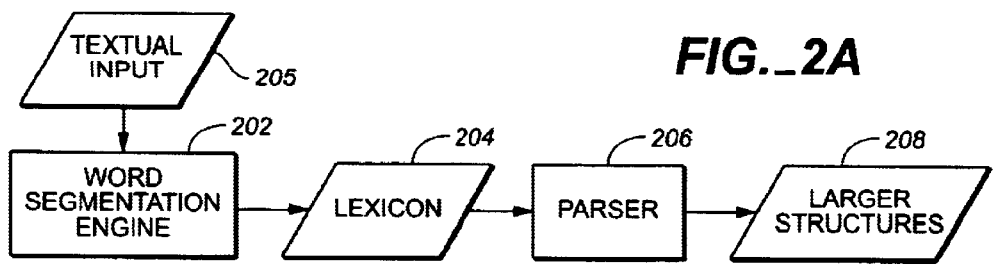
*FIG._2A*
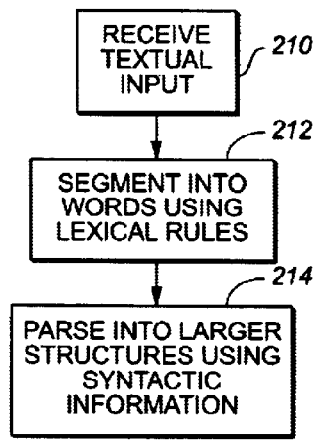
*FIG._2B*
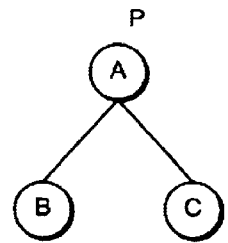
*FIG._4A*
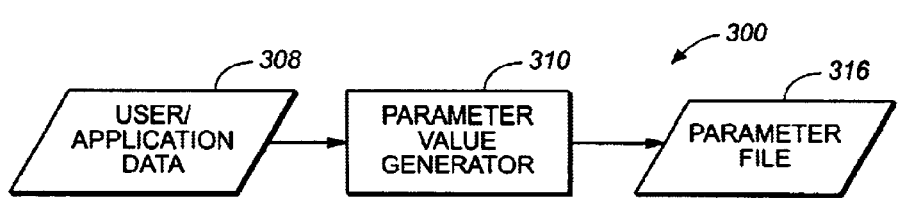
*FIG._4B*

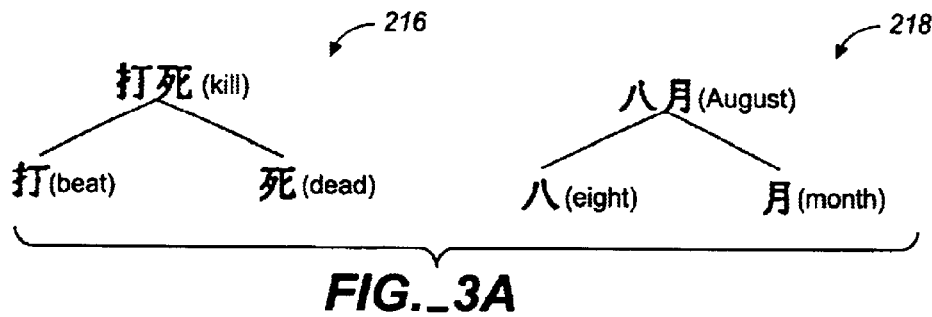
FIG._3A
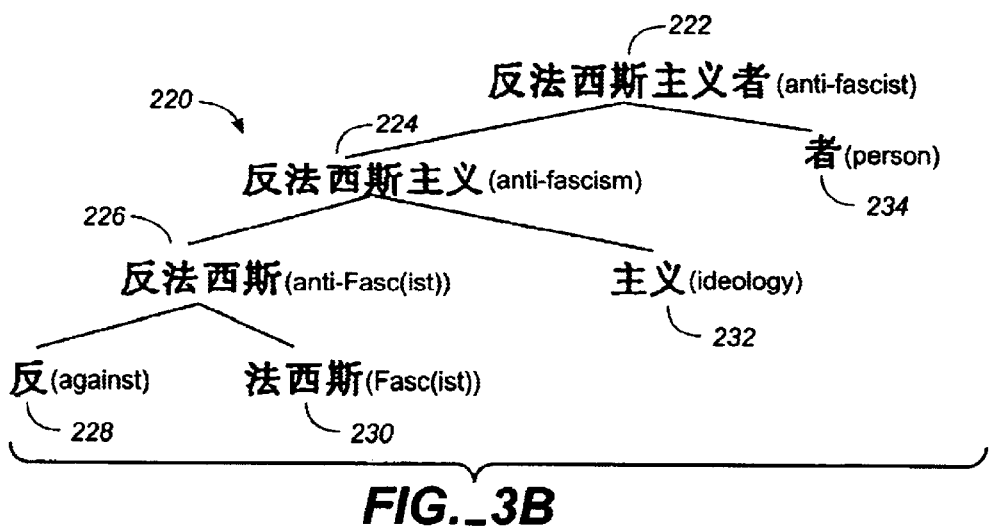
FIG._3B
FIG._3C

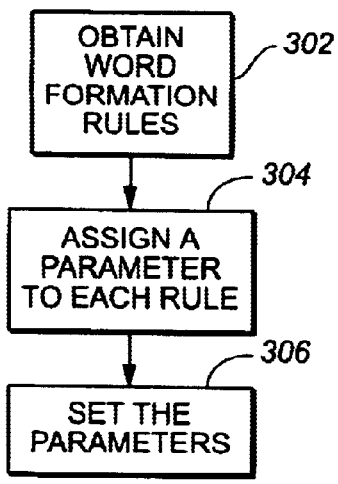
FIG._4C
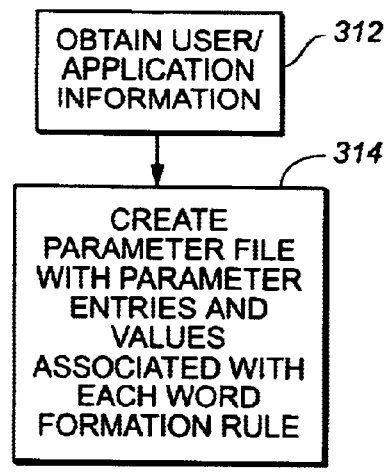
FIG._4D
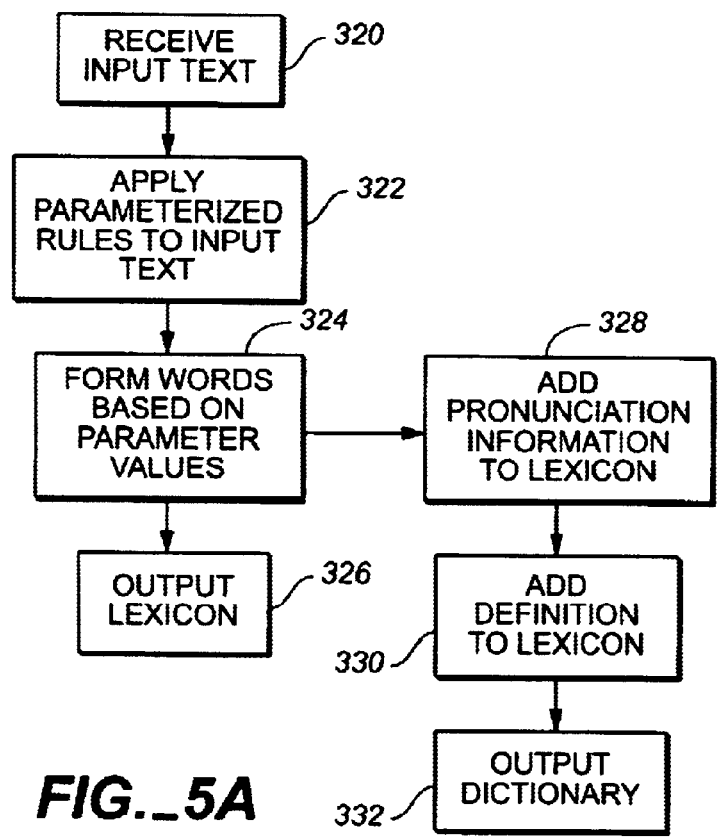
FIG._5A

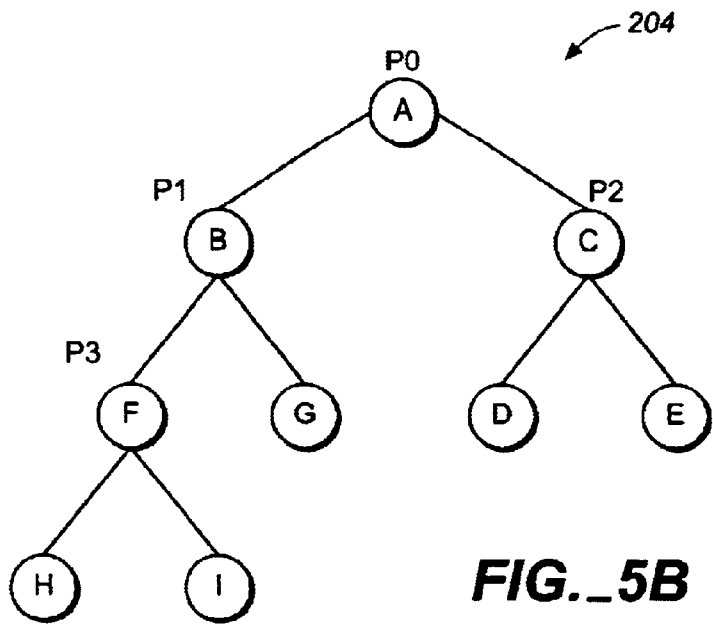
FIG._5B
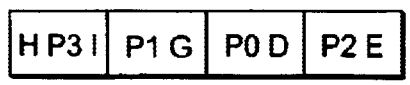
FIG._5C
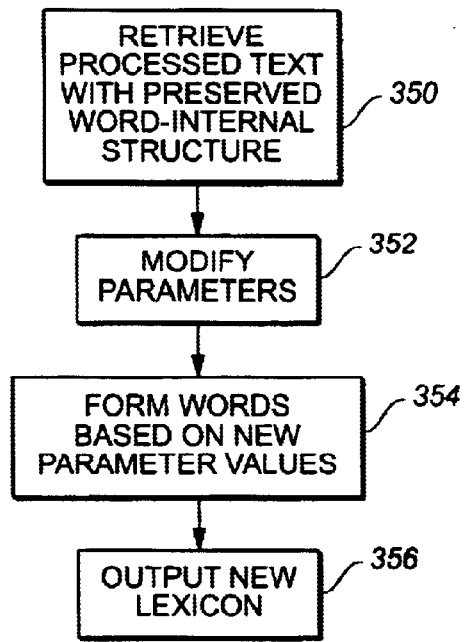
FIG._6

PARAMETERIZED WORD SEGMENTATION OF UNSEGMENTED TEXT

REFERENCE TO CO-PENDING APPLICATIONS

References hereby made to the following U.S. Patent Applications:

Ser. No. 09/023,586, filed Feb. 13, 1998 which is no abandoned, entitled WORD SEGMENTATION IN CHINESE TEXT;

application Ser. No. 09/116,560, filed Jul. 15, 1998, entitled PROPER NAME IDENTIFICATION IN CHINESE; and Serial No. PCT/US99/00337, filed Jan. 7, 1999, entitled WORD SEGMENTATION IN CHINESE.

The above-identified Applications are hereby incorporated by reference.

BACKGROUND OF THE INVENTION

Word segmentation refers to the process of identifying the individual words that make up an expression of language, such as text. Word segmentation is useful for, among other things, checking spelling and grammar, synthesizing speech from text, and performing natural language parsing and understanding, all of which benefit from an identification of individual words.

Performing word segmentation of English text is rather straight forward, since spaces and punctuation marks generally delimit the individual words in the text. Consider the English sentence: "The motion was then tabled—that is removed indefinitely from consideration."

By identifying each contiguous sequence of spaces and/or punctuation marks as the end of the word preceding the sequence, this English sentence may be straightforwardly segmented as follows:

The motion was then tabled—that is removed indefinitely from consideration.

However, word segmentation is not always so straightforward. For example, in unsegmented languages, such as Chinese, a written sentence consists of a string of evenly spaced characters, with no marking between the words. This is because the Chinese language originated as a monosyllabic language, meaning that there was a separate Chinese character for each word in the Chinese language. As the Chinese language developed, the requirement to add an additional character for each word became cumbersome. Thus, the language began to combine two or more characters to represent a new word, rather then developing a whole new character to represent the new word. Currently, the Chinese language has many polysyllabic words, which are commonly understood by those who speak the Chinese language.

However, due to the structure of Chinese words, there is not a commonly accepted standard for "wordhood" in Chinese. This problem is discussed in greater length in Duannu, San (1997). Wordhood in Chinese, in J. Packard (ed) *New Approaches to Chinese Word Formation*, Moton de Gruyter. While native speakers of Chinese in most cases are able to agree on how to segment a string of characters into words, there are a substantial number of cases (perhaps 15–20% or more) where no standard agreement has been reached.

Not only do different people segment Chinese text differently, but it may also be desirable to segment the text differently for different applications. For example, in natural language processing applications, such as information retrieval, word segmentation may be desirably performed in one way, in order to improve precision, while it may be desirably performed in a different way, in order to improve recall.

Therefore, it has been very difficult, in the past, to provide a word segmentation component which meets the needs of individuals who do not agree on how unsegmented text should be segmented. This problem is exacerbated when one considers that the general word segmentation rules may desirably change from application-to-application.

SUMMARY OF THE INVENTION

The present invention segments a non-segmented input text. The input text is received and segmented based on parameter values associated with parameterized word formation rules.

In one illustrative embodiment, the input text is processed into a form which includes parameter indications, but which preserves the word-internal structure of the input text. Thus, the parameter values can be changed without entirely re-processing the input text.

BRIEF DESCRIPTION OF THE DRAWINGS

FIG. 1 is a high level block diagram of one exemplary environment in which the present invention can be used.

FIG. 2A is a block diagram illustrating a word segmentation engine in accordance with one embodiment of the present invention.

FIG. 2B is a flow diagram illustrating the operation of the system illustrated in FIG. 2A.

FIGS. 3A and 3B are trees representative of word formation rules.

FIG. 3C shows a number of possible segmentations.

FIG. 4A illustrates a general form for an annotated word formation rule.

FIG. 4B is a block diagram of a parameter value generator system in accordance with one embodiment of the present invention.

FIGS. 4C and 4D are flow diagrams further illustrating how parameters are set in accordance with one embodiment of the present invention.

FIG. 5A is a flow diagram illustrating one embodiment of how a lexicon or dictionary is created.

FIG. 5B illustrates an annotated word formation rule tree.

FIG. 5C illustrates one embodiment of a record showing the word formation rules applied as in FIG. 5B.

FIG. 6 is a flow diagram illustrating the modification of a lexicon in accordance with a modified parameter.

DETAILED DESCRIPTION OF THE ILLUSTRATIVE EMBODIMENT

The present invention uses word segmentation rules to segment unsegmented language. In one illustrative embodiment, there are two stages of word segmentation. In the first, minimal words, which have wordhood that is noncontroversial, are looked up in a dictionary. In the second stage, word formation rules are applied to combine minimal words and characters into larger words. In one illustrative embodiment, the word segmentation rules are parameterized such that word segmentation can be easily customized or varied based on user or application needs. Prior to a detailed discussion of the present invention, an overview of an operating environment may be helpful.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including handheld devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a central processing unit 21, a system memory 22, and a system bus 23 that couples various system components including the system memory 22 to the central processing unit 21. The system bus 23 ay be any of several types of bus structures including a memory bus or a memory controller, a peripheral bus, and a local bus using any of a variety of bus architectures. The system memory 22 includes read only memory (ROM) 24 and a random access memory (RAM) 25. A basic input/output system (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices, such as a keyboard 40, a pointing device 42 and a microphone 62. Other input devices (not shown) may include a joystick, game pad, satellite dish, scanner, or the like. These and other input devices are often connected to the central processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker and a printer (not shown).

The personal computer 20 may operate in a networked environment using logic connections to one or more remote computers, such as a remote computer 49. The remote computer 49 may be another personal computer, a server, a router, a network PC, a peer device or another network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated by those skilled in the art that the network connections shown are exemplary and other means of establishing a communications link between the computers may be used.

FIG. 2A is a high-level block diagram of a text processing system 200 in accordance with one illustrative embodiment of the present invention. FIG. 2B is a flow diagram illustrating the operation of system 200. As discussed in the Background portion of the present application, some languages, such as Chinese, are unsegmented languages. Such languages can simply be composed of a group of evenly-spaced characters. Segmentation of such characters into words according to different word formation rules has proven very difficult.

System 200 is one illustrative embodiment of a word segmentation system for such languages. System 200 includes word segmentation engine 202 which receives a textual input 205. Word segmentation engine 202 provides a word list or lexicon 204 at its output, to a parser 206. Parser 206 is used to form larger structures 208.

More specifically, in order for system 200 to segment unsegmented text, textual input 205 is provided to word segmentation engine 202. This is indicated by block 210 in FIG. 2B. The textual input can be typed in by a user, or it can be automatically presented to word segmentation engine 202, such as by transferring a textual file or a portion of machine readable text to word segmentation engine 202.

In any case, word segmentation engine 202 receives the textual input and segments it into words using lexical rules. Examples of such rules are described below with respect to FIGS. 3A–3C. Application of the rules to the textual input is indicated by block 212 in FIG. 2B.

Once the lexical rules have been applied to the textual input, word segmentation engine 202 provides segmented words (a lexicon 204) at its output. Any number of things can be done with lexicon 204. In the example illustrated in FIG. 2A, lexicon 204 is provided to parser 206.

Parser 206 parses lexicon 204 into larger structures, such as phrases or sentences, using syntactic information. This is indicated by block 214 in FIG. 2B. Parser 206 then provides these larger structures 208 at its output. The larger structures 208 can be used in a wide variety of manners, such as in information retrieval, speech recognition or text-to-speech synthesizers, machine transcription, document clustering applications, or any other application which may find use for larger structures 208.

Before proceeding with further discussion of the present invention, a concrete example may be helpful. For instance, the Chinese word for "kill" is 打,死, where 打 and 死 can be independent words which mean "hit/beat/attack" and "dead/death",respectively. This explains why some speakers treat the character sequence 打,死 as a single word while others treat it as two separate words ("beat (to) death"). Another example is 八,月 ("August") which is composed of 八 ("eight") and 月 ("moon/month"). This character sequence literally means "the eighth month". What is common to these words is that they all have word-internal structures. The structures are well defined and can be classified into dozens of types, each with its own special internal pattern.

Represented graphically, each word is a tree such as trees 216 and 218 illustrated in FIG. 3A. Word tree 216 illustrates the word tree for the Chinese translation of the word "kill". Word tree 218 illustrates the word tree for the Chinese equivalent for the word "August".

The word-internal structure of any given word can be fairly complex. This is illustrated in FIG. 3B which shows the word tree for the word "anti-fascist". Specifically, FIG. 3B illustrates word tree 220 which includes nodes 222, 224 and 226, and leaves 228, 230, 232 and 234. The Chinese characters for each word are indicated on the left, and the English translation is indicated parenthetically. It can be seen that leaves 228 and 230 include the Chinese characters for the words "against" and "Fasc". If those words are combined according to a word formation rule, the result is found at node 226. Node 226 is shown adjacent leaf 232 which shows the Chinese character for the word "ideology". If node 226 is combined with leaf 232, the result is illustrated at node 224 which translates as "anti-fascism". Leaf 234 indicates the Chinese character for the term "person". If that character is combined, according to a word formation rule, with node 224, the result is a set of Chinese characters segmented into a single word meaning "anti-fascist".

It can be seen from tree 220 illustrated in FIG. 3B, that the set of Chinese characters can be segmented in one of four ways as illustrated in FIG. 3C. Segmentation 236 shows all of the Chinese characters segmented as a single word as shown at node 222 in FIG. 3B. Segmentation 238 corresponds to the level in tree 220 which includes node 224 and leaf 234 in FIG. 3B. The slash mark in segmentation 238 indicates where the Chinese characters are segmented. Segmentation 240 corresponds to the level of tree 220 in FIG. 3B which includes node 226, and leaves 232 and 234. Again, the slash marks indicate segmentation. Finally, segmentation 244 corresponds to the level in tree 220 which includes each of the leaves 228, 230, 232 and 234, segmented separately.

In determining which segmentation to use, one must apply a set of word formation rules. As discussed above, there is not a common agreement as to which word formation rules are to be used. Therefore, word segmentation has posed many difficulties.

A number of commonly used word formation rules, and examples of those rules, are set out below.

(i) Verb+VComp→Verb e.g. 打+死→打死

(ii) Number+CalendarTerm→Noun e.g. 八+月→八月

(iii) Prefix+Noun→Adjective e.g. 反+法西斯→反法西斯

(iv) Adjective+AdjSuffix→Noun e.g. 反法西斯+主·→反法西斯主·

(v) Noun+NounSuffix→Noun e.g. 反法西斯主·+者→反法西斯主·者

It can be seen that each of these word formation rules have the same general structure which is illustrated in FIG. 4A. The simplified tree structure in FIG. 4A shows that where two characters B and C meet the requirements of the word formation rule, they are formed into a single word A which is composed of both characters B and C. Since not all people agree on which word formation rules to apply, the present invention parameterizes the word formation rules (illustrated by "P" in FIG. 4A). Depending upon the value of the parameter, the word formation rule will either be applied, or it will not be applied. The parameter can be set by the user or can be preset by the manufacturer, based on any number of criteria, so that certain word formation rules can be activated or deactivated, as desired.

In accordance with one illustrative embodiment, a separate parameter file is generated for each user or application. The parameter file contains a list of parameters which are set to values that reflect a user or application preference. The parameter values in the parameter file are each associated with a preselected one of the word formation rules. Therefore, before applying the word formation rules, the parameter file is accessed to activate or deactivate selected ones of the word formation rules, based upon the parameter values.

FIG. 4B is a block diagram of a system 300 which is used in generating the parameter file. FIGS. 4C and 4D are flow diagrams illustrating the operation of system 300 shown in FIG. 4B. First, a set of word formation rules are obtained. This is indicated by block 302 in FIG. 4C. For purposes of the present invention, the particular word formation rules being used are unimportant. It is only important that word formation rules are obtained for segmenting text in a generally unsegmented language. Each of the word formation rules is then assigned a parameter, as indicated by block 304 in FIG. 4C. The parameter values are then set, in order to provide a value to each parameter in the parameter file. This is indicated by block 306.

In order to set the parameter values, user or application data 308 (in FIG. 4B) is provided to parameter value generator 310. The information obtained from a user can simply be empirical which is obtained based on past user preferences. Similarly, the user can be asked a certain set of questions to obtain the user preferences with respect to the various word formation rules which can be applied. In addition, the user can simply provide a specification indicating how the user wishes to have the word segmentation process performed. Application specific data can also be obtained. In other words, if the word segmentation system is to be used in an information retrieval engine, that may reflect a different set of activated word formation rules than if it is going to be used, for example, in a machine translation program.

In any case, parameter value generator 310 obtains the information from the user, or based on the application, or from another source which reflects that certain word formation rules are to be activated or deactivated. This is indicated by block 312 in FIG. 4D.

Based on this information, parameter value generator 310 simply assigns values to the parameters in the parameter file. This is indicated by block 314 in FIG. 4D. In one illustrative embodiment, the parameter values are simply binary values which indicate whether the associated word formation rules (associated with these parameters) are to be applied to incoming text. The result of this process is a parameter file 316 which has a set of parameters, each having a value, and each parameter being associated with a predetermined word formation rule.

FIG. 5A is a flow diagram of one illustrative embodiment of the operation of the word segmentation engine 202 illustrated in FIG. 2A, after the parameter values have been set as discussed above. First, word segmentation engine 202 receives textual input 205. This is indicated by block 320 in FIG. 5A. In the embodiment illustrated, textual input 205 is a set of characters H I G D and E used in the tree shown in FIG. 5B. Each letter is indicative, for example, of a character in an unsegmented language (such as Chinese). The characters are arranged as leaves on a tree structure to illustrate the potential application of word formation rules associated with those characters.

In the tree structure illustrated in FIG. 5B, the tree starts at an uppermost node A and descends through a series of nodes or leaves. For example, the term represented by the letter C is a descendant of ancestor node A and has two of its own descendants D and E. D and E are leaves in the tree, because neither has any additional descendants. Both terms A and C are ancestors of leaves D and E, C being an immediate ancestor and A being an ancestor twice removed. The ancestor terms represent potential combinations of the leaves which descend therefrom, based on whether the word formation rule associated with the ancestor node is activated or deactivated.

Each node in the tree is also annotated with a parameter value, designated P0 through P3. With the word formation rules associated with the nodes in the tree parameterized as illustrated in FIG. 5B, the word formation rules can either be activated (in which case the two descendent characters which descend from the annotated node are combined) or deactivated (in which case the two descendent characters which descend from the annotated node remain as individual words). However, it will also be noted that the tree structure illustrated in FIG. 5B maintains the word-internal structure for the original input text (characters H I G D and E). Therefore, the incoming text needs only to be processed once, regardless of whether the values of the word segmentation parameters in the parameter files are subsequently changed. This is explained in greater detail with respect to FIG. 6 below.

Based on the particular parameter values of parameters P0–P3, the input text illustrated as the tree structure in FIG. 5B is segmented. Application of the parameterized word formation rules to the input text, retaining the original word-internal structure, is illustrated by block 322 in FIG. 5A.

FIG. 5C illustrates one illustrative embodiment of a representation of the input text having parameter indicators inserted therein. The positions of the parameter indicators P0–P3 in the character string is determined based on the particular word formation rules being used and indicate possible segmentation points. The possible segmentation points correspond to the nodes in the tree of FIG. 5B. Whether the possible segmentation points constitute actual segmentation points depends on the value of the associated parameters (i.e. it depends on whether that particular word segmentation rule is to be applied).

In order to form words based on this representation, word segmentation engine 202 simply needs to access the parameter file to obtain the value for each of the parameters P0–P3. Assume, for example, that a parameter value of 0 means no segmentation (i.e., the word formation rule is applied so that the incoming text is not segmented at the point at which the parameter is placed) and a parameter value of 1 indicates that incoming text is to be segmented (i.e., that the word formation rule is not to be applied at that point). Then, the two characters separated by the parameter indicator will be segmented as one word when the parameter value is set to a 0 and two words when it is set to a 1.

In order to eliminate segmentations which are linguistically illegal, one illustrative embodiment of the present invention provides that the segmentation parameter of a node can be set to a 1 only if none of its ancestor nodes is set to a 0.

The word segmentation process by word segmentation engine 202 thus becomes relatively straightforward. For example, given the output text, annotated with parameter indicators as in FIG. 5C, word segmentation engine 202 simply pushes the two characters together when the parameter value is a 0 and replaces the parameter indicator with a space when the parameter value is a 1.

Table 1 below illustrates two steps of values of P0–P3 and the associated segmentation of characters H I G D and E. Of course, the segmentation could be annotated with the combination of the characters H and I designated F, the combination of characters H I G designated B, the combination of characters D and E designated C and the combination of all characters H I G D E designated A. However, for the sake of clarity, segmentation is shown with the original characters retained. Forming the words based on the parameter values is indicated by block 324 in FIG. 5A.

TABLE 1

| P0 | P1 | P2 | P3 | SEGMENTATION |
|----|----|----|----|--------------|
| 1  | 0  | 1  | 0  | HIG D E      |
| 1  | 1  | 0  | 0  | HI G DE      |

Once the words are segmented, they can be used for any application which is capable of using a word list or lexicon. Thus, system 200 can simply output the lexicon as indicated by block 326 in FIG. 5A.

Alternatively, additional information can be added to the lexicon in order to create, for example, a dictionary. For instance, the pronunciation of each word can be added to the lexicon, as can the definition, as indicated by blocks 328 and 330 in FIG. 5A. Once this information is added, the resultant output is a dictionary, as indicated by block 332.

It should be noted that in one illustrative embodiment, as shown in FIGS. 5B and 5C, the word-internal structure of the non-segmented language is maintained. While this is not necessary, it does provide one significant advantage. For example, if one wishes to modify the parameter file, word segmentation engine 202 need not reprocess all of the text. Rather, since the text was first processed by simply placing the parameter markers between the characters as illustrated in FIGS. 5B and 5C, the text, processed at that level, is retrieved, with the word-internal structure still intact. This is indicated by block 350 in FIG. 6. Next, the new or modified parameter is obtained and applied to the processed text. This is indicated by block 352. In other words, if the user changes the parameter value of P0, word segmentation engine 202 simply searches for that parameter marker and switches the appropriate structures indicated in FIGS. 5B or 5C. Word segmentation engine 202 simply reforms the words as required by the new or modified parameter values. This is indicated by block 354. The new lexicon is then output by word segmentation engine 202. This is indicated by block 356.

It can thus be seen that this provides a significant time and resource savings. All of the text need not be reprocessed, completely. Rather, the word formation rules have already placed the parameter markers in the text. Therefore, rather then reprocessing all of the text entirely, the characters simply need to be moved together, or spaced apart, as required by the new parameters.

Although the present invention has been described with reference to preferred embodiments, workers skilled in the art will recognize that changes may be made in form and detail without departing from the spirit and scope of the invention.

What is claimed is:

1. A computer executable method of segmenting a non-segmented input text that includes a plurality of characters segmentable into groups to form words, the spacing of characters relative to one another being nondispositive of the segmentation, the method, comprising:

receiving the input text; and segmenting the input text to obtain segmented text by applying parameterized word formation rules to the input text based on parameter values of the parameterized word formation rules, at least one parameter value being associated with each word formation rule, the word formation rules being used to combine characters into words, the parameter values associated with each rule being accessed to determine whether the associated rule is activated for application to the input text.

2. The method of claim 1 and further comprising providing the parameter values by:

obtaining user information indicative of a user preference as to application of the word formation rules; and setting the parameter values based on the user information.

3. The method of claim 2 wherein obtaining user information comprises:

obtaining a user specification indicative of the user preference.

4. The method of claim 2 wherein obtaining user information comprises:

receiving user responses to a plurality of inquiries regarding desired application of the word formation rules.

5. The method of claim 1 and further comprising providing the parameter values by:

obtaining application information indicative of an application in which the segmented text is to be used; and setting the parameter values based on the application information.

6. The method of claim 1 wherein segmenting comprises: providing the segmented text as a lexicon.

7. The method of claim 6 and further comprising:

parsing the lexicon into larger structures, larger than words.

8. The method of claim 1 wherein segmenting comprises: providing the segmented text as a lexicon;

augmenting the lexicon with additional information to obtain an augmented lexicon; and providing, as an output, the augmented lexicon.

9. The method of claim 8 wherein augmenting comprises:

augmenting the lexicon with pronunciation and definition information.

10. The method of claim 1 wherein segmenting comprises:

annotating the input text with parameter indications, to obtain annotated text, while preserving a word-internal structure associated with the input text.

11. The method of claim 10 and further comprising:

modifying the parameter values to obtain modified parameter values; and re-segmenting the input text according to the modified parameter values.

12. The method of claim 11 wherein comprises:

retrieving the annotated text; and re-segmenting the annotated text based on placement of the parameter indications in the annotated text and the modified parameter values.

13. A computer readable medium having information stored thereon, the information comprising:

a plurality of word formation rules, applicable to non-segmented text including a plurality of characters segmentable into words, to indicate segmentation of the non-segmented text, the spacing of the characters relative to one another being nondispositive of the segmentation;

a plurality of parameters having parameter values, at least one parameter associated with each word formation rule, the parameter values being indicative of desired activation or deactivation of associated word formation rules;

annotated text information indicative of input text annotated with parameter indications, placement of the parameter indications in the input text being according to the word formation rules and indicating possible segmentation points, the parameter values being indicative of whether the possible segmentation points are actual segmentation points, the annotated text information retaining a word-internal structure associated with the input text.

14. The computer readable medium of claim 13 wherein the parameter value is indicative of whether the associated word formation rule is to be applied to the input text.

15. A computer readable medium storing information thereon, the information being for use in applying a plurality of word formation rules to non-segmented text that includes a plurality of characters having a segmentation that is indeterminate from spacing of the plurality of characters relative to one another, the information comprising:

a plurality of segmentation parameters having parameter values, each segmentation parameter being associated with one of the plurality of word segmentation rules and being indicative of whether the associated word segmentation rule is activated so as to be applied to the non-segmented text.

16. An apparatus for segmenting non-segmented input text, comprising:

a customizable word segmentation engine configured to receive the input text and selectively apply one or more of a plurality of word formation rules to the input text to segment the input text, wherein the word segmentation engine is configured to access a plurality of segmentation parameters associated with the plurality of word formation rules and to apply the plurality of word formation rules based on the associated segmentation parameters.

17. The apparatus of claim 16 and further comprising:

a parser coupled to the word segmentation engine.

18. The apparatus of claim 16 wherein the word segmentation engine is configured to receive and annotate the input text to obtain annotated text information indicative of the input text annotated with parameter indications, placement of the parameter indications in the input text being according to the word formation rules and indicating possible segmentation points, the parameter values being indicative of whether the possible segmentation points are actual segmentation points, the annotated text information retaining a word-internal structure associated with the input text.

* * * * *

UNITED STATES PATENT AND TRADEMARK OFFICE
CERTIFICATE OF CORRECTION

PATENT NO. : 6,678,409 B1 Page 1 of 1
DATED : January 13, 2004
INVENTOR(S) : Wu et al.

It is certified that error appears in the above-identified patent and that said Letters Patent is hereby corrected as shown below:

Column 1,
Line 7, "no" should be -- now --
Line 11, "application" should be -- Application --
Lines 36-37, sentence should be underlined -- <u>The motion was then tabled that is removed indefinitely from consideration</u>. --

Column 3,
Line 25, "ay" should be -- may --

Column 5,
Lines 12, 15 and 17, delete the commas between the two characters in each of the lines.

Column 10,
Line 12, after "wherein" insert -- re-segmenting --

Signed and Sealed this

Third Day of August, 2004

JON W. DUDAS
*Acting Director of the United States Patent and Trademark Office*